FIG. I

Dec. 6, 1966 — A. S. HUBIN — 3,289,470
PAPER TESTING MACHINE
Filed Nov. 29, 1963 — 5 Sheets-Sheet 2

Dec. 6, 1966  A. S. HUBIN  3,289,470

PAPER TESTING MACHINE

Filed Nov. 29, 1963  5 Sheets-Sheet 5

United States Patent Office 3,289,470
Patented Dec. 6, 1966

3,289,470
PAPER TESTING MACHINE
Anthony S. Hubin, Appleton, Wis., assignor to Kimberly-Clark Corporation, Neenah, Wis., a corporation of Delaware
Filed Nov. 29, 1963, Ser. No. 326,998
8 Claims. (Cl. 73—102)

My present invention relates to a device for testing the bursting strength of specimens of paper, cardboard, plastic sheet material and the like when subjected to a sudden impact.

For the evaluation of the burst strength of packaging materials a test device which is simple in operation and from which results may be obtained quickly is much desired.

The commonly employed free falling dart method of measuring impact burst strength provides a reliable guide for package design and is satisfactory for use in standards of the ASTM No. D1709-59T issued in 1959. Such procedure, however, involves a statistical analysis and the examination of a very considerable plurality of samples in order to procure the necessary information. This invention contemplates the provision of a device which permits the attainment of significant burst strength results with a minimum of, or even a single, specimen. Tests have shown that with the device described herein, values of burst strength are quickly obtained and that such values correlate well with data obtained by the noted conventional method.

In essence, my test device measures the energy required to burst a single specimen by comparing the original energy of an impact compound pendulum with the energy remaining after bursting of a sample. The energy so remaining after specimen rupture is imparted to a measuring device which preferably is also a compound pendulum. Additionally and importantly, my device provides for the confining of the sample in a peripheral sense during test to simulate field conditions.

The invention will be more fully understood by reference to the following detailed descriptions and accompanying drawings wheren:

In the drawings, where practicable, corresponding parts are designated by similar numerals and primed.

Figure 1:
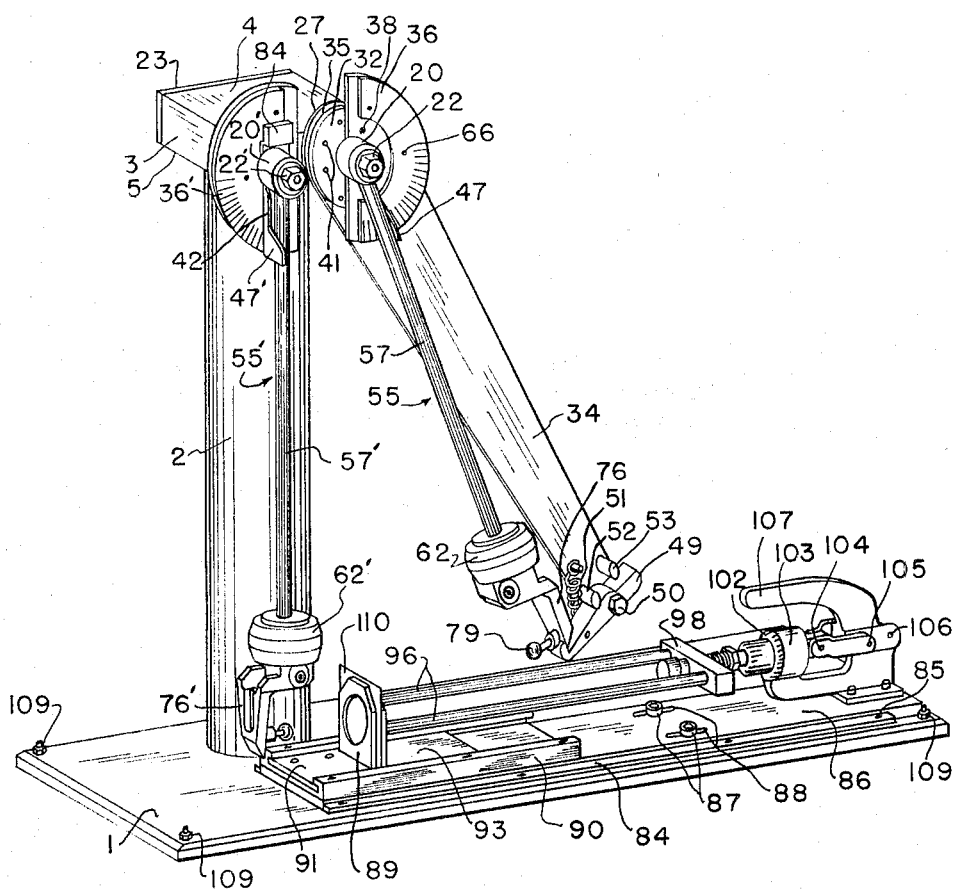
FIG. 1 is a view in perspective of the device of the invention in position for initiating a test.
Figure 5:
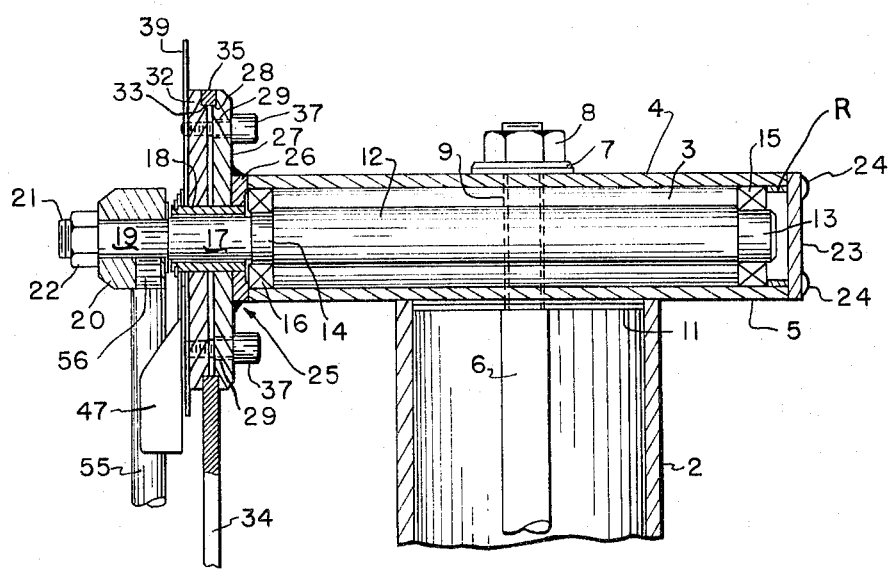
FIG. 5 is a view taken essentially on line 5—5 of FIG. 4.
Figure 6:
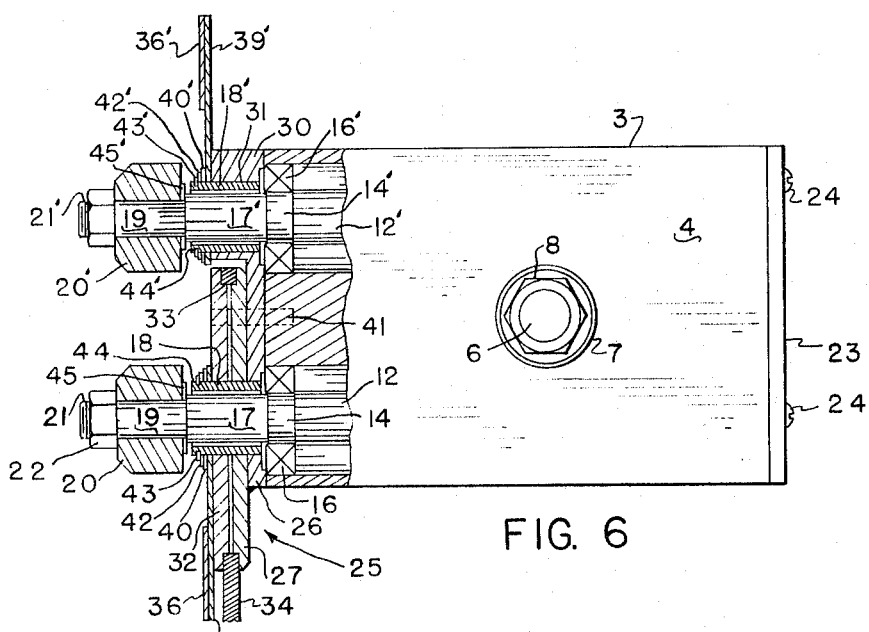
FIG. 6 is a top plan view partially in section and with parts broken away of the structure illustrated in FIGS. 4 and 5.
Figure 7:
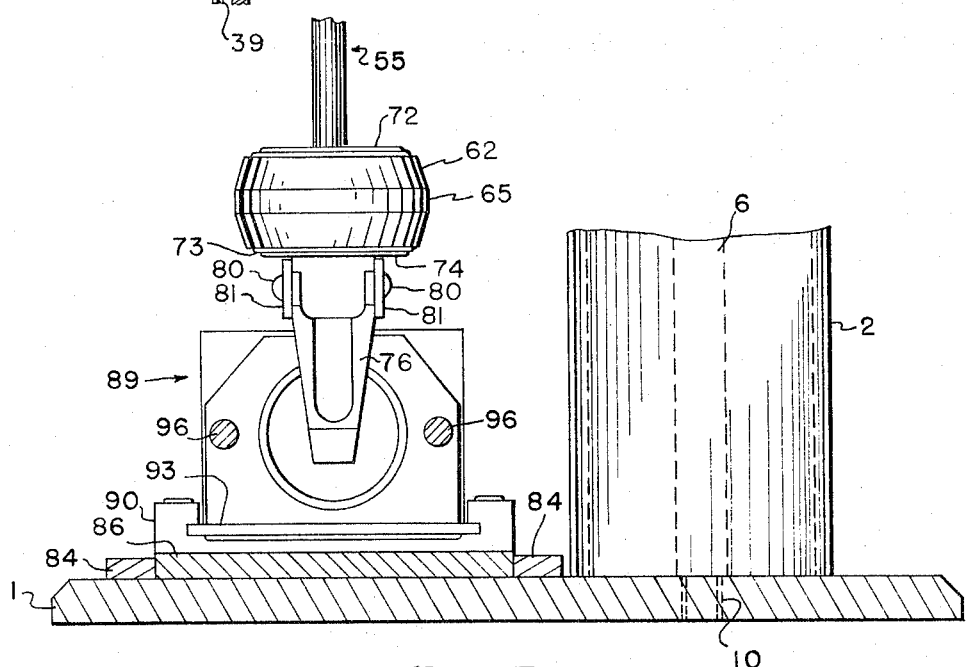
FIG. 7 is a sectional view taken on line 7—7 of FIG. 2.

Referring to the drawings more in detail, the numeral 1 designates a longitudinally extending relatively wide base. A stanchion 2 in the form of an upright hollow open-ended cylinder serving as a support is carried by the base 1 rearwardly. Mounted upwardly on the stanchion 2 so that it may be readily removed or adjusted vertically relative to the base is a bearing housing 3 of generally rectangular shape (FIGS. 1, 5 and 6). The numeral 4 designates the top side of the bearing housing and the numeral 5 the lower side. Extending centrally downwardly through the bearing housing 3 and stanchion 2 is a stay bolt 6 (FIGS. 5 and 7). A washer 7 (FIGS. 5 and 6) bears against the top side 4 of the bearing housing 3 and the stay bolt is shouldered and (FIG. 5) threaded to receive a nut 8 which secures the upper end of the stay bolt relative to the bearing housing. The stay bolt is of such a length that it extends downwardly and is threadedly received at 10 in the base 1 (FIG. 7). A guide 11 (FIG. 5) in the form of a circular washer is received on the shouldered threaded portion 9 of the stay bolt 6 within the upper end of the stanchion 2 and serves to prevent lateral movement between the stanchion cylinder and the stay bolt. It will be appreciated that by simply removing the nut 8 the bearing housing 3 may be raised and washers inserted between the stanchion 2 and the bearing housing 3 to adjust the bearing housing height relative to the base 1. Further references to this feature will be made hereinafter.

Bearing housing 3 has rotatably mounted therein (FIGS. 5 and 6) a pair of horizontally extending spaced, parallel spindles 12, 12'. For convenience the mechanism associated with spindle 12 will first be described in detail and reference will then be made to the mechanism associated with spindle 12'. As may be seen, the spindle 12 (FIG. 5) is shouldered at 13, 14 at opposite ends for receipt of bearings 15, 16; the bearings form the only necessary contact support of the spindle. The spindle 12 is additionally shouldered at 17 to provide for receipt in spaced reation therewith of a sleeve 18; the spindle is further shouldered at 19 to provide for the receipt of a retainer 20 in the form of a large hub, this retainer being adapted to receive a pendulum rod as described hereinafter. The spindle 12 (FIG. 5) is threaded at 21 for the receipt of a nut 22 which bears against the retainer 20 as shown and holds the retainer fixedly for rotation with spindle 12.

The bearing housing 3 (FIG. 5) is closed at the right hand end by a rectangular plate 23 and a plurality of threaded bolts 24 retain the plate in position. This plate abuts ring R to hold the bearing 15 in fixed position against longitudinal movement rightwardly (FIG. 5). The leftward end (FIG. 5) of the bearing housing 3 is provided with a mount designated generally at 25 in which there are suitably provided a plurality of components as an integral unit. The mount 25 includes a rectangular plate 26 (FIGS. 5 and 6) which, in essence, is similar to the plate 23 and serves to close the leftward end of the bearing housing 3. Welded to the outer face of the plate 26 is a circular disc 27 (FIGS. 1, 5 and 6) apertured centrally for snug fit of the sleeve 18 therein; the sleeve 18 is thus retained in the noted spaced relation with the spindle 12 since it has an internal diameter slightly greater than shoulder 17. This reduces friction losses in the device.

Disc 27 is undercut peripherally at 28 (FIG. 5) and is further provided with a plurality of openings as at 29 (FIG. 5). The mount 25 further includes an integral spacer block 30 (FIG. 6) which is also provided with an opening 31 for the passage of the second of the two spindles at 12' and receipt thereover of a sleeve 18'. This spacer block is simply for the purpose of spacing mechanism to be described hereinafter outwardly from the bearing housing 3 to the same extent that the mechanism illustrated in FIG. 5 is spaced from the bearing housing 3. Bolts (not shown) which pass through the disc 27 and the spacer block secure the mount 25 to the housing 3 just as do the bolts 24 secure the end plate 23 to the housing. These bolts for the mount are secured when the mount is positioned before assembly of other elements now to be described.

Figure 2:
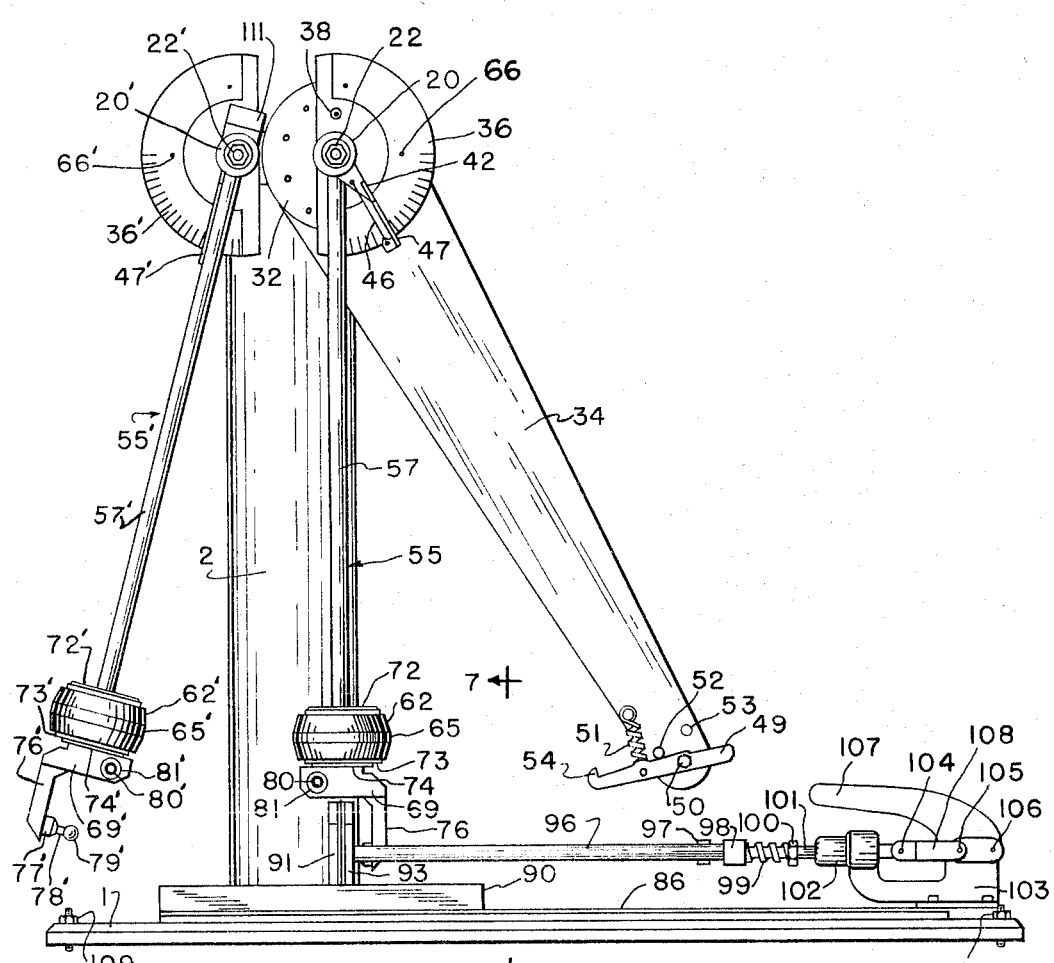
FIG. 2 is a front view of the device of FIG. 1 as a burst test is completed.

Referring particularly to FIGS. 5 and 6, a second circular apertured disc 32 having a peripheral undercut 33 corresponding to the undercut 28 of disc 27 also receives the sleeve 18 and the undercut portions 28, 33 cooperate to receive therebetween and thereon a generally radially extending arm 34 (FIG. 1). The arm 34 (FIGS. 1, 5 and 6) is apertured at its upper end at 35 (FIG. 5) for receipt over the cooperating undercut portions 28, 33 of the cooperating discs 27 and 32. The arm 34 normally extends downwardly rightwardly as shown (FIGS. 1 and 2). The openings as at 29 each receive a cap screw 37 which cap screws pass through disc 27, the aperture 35 of arm 34, and are threaded into the disc 32 to securely retain the discs and, accordingly, the arm 34 by friction, against rotational movement. Release of the cap screws 37 permits adjustment of the rotational position of the arm 34.

In assembly of the device the mount 25 is positioned, the arm 34 mounted, the disc 32 positioned but not securely fixed until an exact positioning has taken place. This is for the purpose of insuring that the sleeve 18, force fitted into the mount 25, is completely clear of shaft 12 and that sleeve 18' is clear of shaft 12'. This is effected by visually insuring the spacing and then driving dowels 41. Thereafter the cap screws 34 are tightened. Dowels 41 (FIGS. 4 and 6) serve the additional purpose of preventing rotation of disc 32 and attached scale plate 39 when the position of arm 34 is adjusted as will be described hereinafter.

Figure 4:
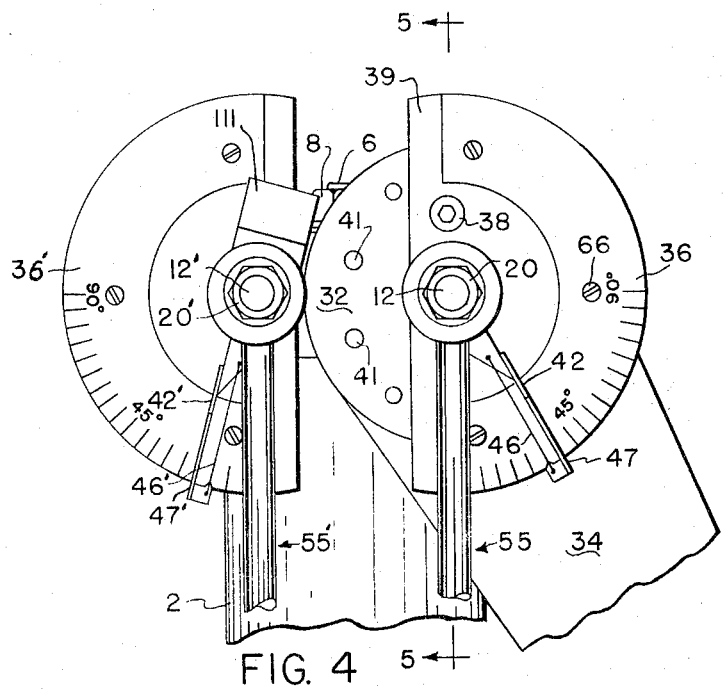
FIG. 4 is a frontal view somewhat enlarged of the upper portion of the structure of FIGS. 1 and 2.

Also mounted on the sleeve 18 and secured to the disc 32 by a threaded bolt 38 (FIGS. 1 and 2) is scale plate 39. Plate 39 carries a scale 36 graduated in angular degrees (FIG. 4). For sake of clarity the 45° and 90° indicia are designated in FIG. 4 only; the indicia might of course take different forms for specific purposes. At the leftward end of the sleeve 18 there is a felt washer 40 (FIG. 6). A pointer 42 is rotatably received over sleeve 18 and pressed at its upper end against the washer 40 by a retaining ring 43 fitted into an undercut portion 44 of the sleeve 18. The pointer 42 is limitedly free to rotate between the felt washer and the retaining ring under the influence of manual pressure or the pressure of the pendulum shaft, the washer serving to provide a slight frictional effect so that the pointer when moved to position remains set. The retainer 20 (FIG. 6) is urged into abutment with a washer 45 and toward the shoulder 17 of the spindle 12 by the nut 22. Accordingly, the retainer rotates with the spindle 12. The thickness of the washers 45, 45' serves the purpose of permitting exact alignment of the hubs 20, 20' in a vertical plane to achieve accurate orientation with respect to the holder to be described.

The pointer 42 includes a hairline indicating element 46 and an upturned rod contact portion 47 for purposes which will hereinafter be apparent.

The arm 34 at its lower end (FIGS. 1, 2) pivotally carries a trip element 49 which is pivoted on a bolt 50 threadedly received in the arm 34' The trip element is normally biased by a light tension spring 51 to the position of FIG. 2. The numeral 52 indicates a first stop to limit rotation of the pivot trip element in a clockwise direction, while the numeral 53 indicates a second stop on the opposite side of the pivot to limit travel of the trip element in a counterclockwise direction. The hook portion of the trip element is designated at 54 and receives the impact imparting pendulum 55 as shown (FIG. 1).

The position of the arm 34 and accordingly of the trip element 49 is readily adjustable by releasing the cap screws 37 moving the arm 34 rotatably and resetting the cap screws.

Figure 8:
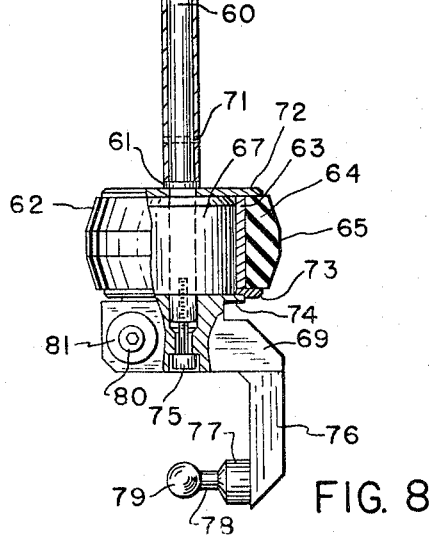
FIG. 8 is an enlarged view partially in section of the compound pendulum illustrated in the preceding figures.

Retainer 20 provides the support for the impact imparting compound pendulum designated generally at 55 and which includes a vertically depending shaft assembly, a pendulum bob and a carrier. This shaft assembly includes a hollow shaft 57 (FIG. 8). Received within the upper end of the hollow shaft is a solid rod 58 having an upper projecting end 56 threadedly received within the retainer 20 (FIG. 5). This solid rod 58 (FIG. 8) is pinned to the hollow shaft at 59 to prevent any relative movement between the rod and shaft. The solid rod serves the purpose of rigidly securing the shaft and of providing weight above the bob 62 as will be more particularly noted hereinafter.

Hollow shaft 57 terminates above the bob 62 and receives within the shaft lower end a second solid rod 60 which projects well below the hollow shaft. This latter solid rod is shouldered at 61 (FIG. 8) so that it may abut the lower end of hollow shaft 57.

The bob 62 itself includes a rigid hollow cylinder of short length designated at 63 and which is provided with a peripheral, ground rubber cover 64 having a flat medial zone 65. This sleeve is preferably of relatively soft rubber of good resiliency; a rubber of a durometer of 25 to 35 has been found satisfactory and such may be readily ground to a good degree of accuracy. It has been found that a resilient cover is preferable to metal in bob to bob contact as the resilient cover minimizes energy losses upon impact. This rubber cover 64 preferably extends slightly beyond (about 1/64 inch) the ends of the cylinder 63 for the purpose noted below.

The head 67 (FIG. 8) of a carrier 69 in the form of a combination weight adjustment and penetrator element is received within the cylinder 63 in a close, sliding fit. Carrier 69 and its head 67 are bored vertically and receive the lower projecting end of solid rod 60. Rod 60 is pinned to the hollow shaft 57 at 71. Interposed between shoulder 61 of shaft 60 and the cylinder 63 is a cover or flange 72 which is adapted to abut the lower end of shoulder 61. A second cover 73 is interposed between the bottom of cylinder 63 and the flange 74 of the carrier 69. Rod 60 is tapped at its lower end to receive cap screw 75 threadedly; drawing the cap screw tight (FIG. 8) fixes the bob and carrier in position and compresses the rubber cover 64 of cylinder 63.

Carrier 69 serves the purpose of providing weight below the bob and also of providing support for a penetrator element. For this latter purpose there is provided an offset and depending portion 76 of the carrier and this offset portion includes a boss 77 and a stud 78. The offset, including the boss and stud, are generally in the form of a bow or U which opens toward the specimen holder to be described. On the exterior end of the stud 78 there is a spherical ball member 79 forming a penetrator element. Screws as at 80 retain tare weights 81 for the purpose of providing accurate adjustment of the entire pendulum weight so that the centerline of shaft 57 is coincident with a vertical or axial line passing through the center of the ball member 79 as well as the pendulum bob axis; that is, the weight adjustment provides for proper pendulum suspension.

The combination thus described provides for exactly setting the center of percussion and the center of gravity of the compound pendulum and permits the attainment of a device having a minimum of vibration in service.

Figure 3:
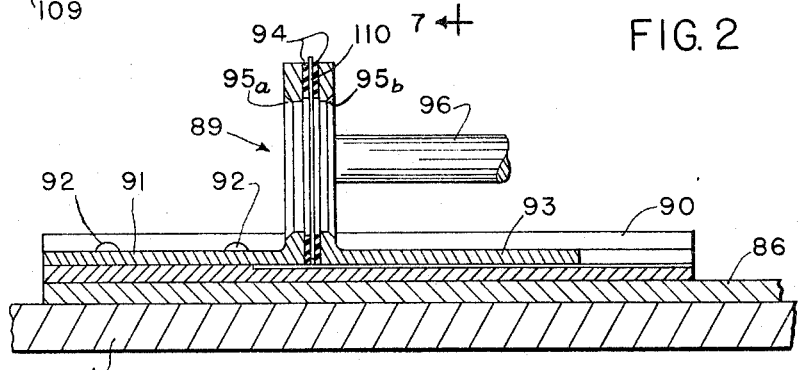
FIG. 3 is an enlarged fragmentary view in section illustrating the specimen holding device of FIGS. 1 and 2 and its arrangement.

The base 1 (FIGS. 1, 2, 3) carries a slide 86 which is limitedly longitudinally adjustable on the base in longitudinally extending guides 84 fixed on the base by cap screws as at 85. Cap screws 87 in slots 88 limit the movement of the slide and retain the slide on the base. The slide 86 itself carries guideways 90 in which a specimen holder 89 is mounted. The specimen holder is of the clamp type and comprises two basic parts; the first and fixed part 91 of the specimen holder includes a longitudinally horizontally extending portion mounted in the guideways 90 and secured in position by button head socket cap screws 92 (FIG. 3). The upright portion includes an aperture 95a (FIG. 3).

The movable part 93 of the specimen holder likewise includes a longitudinally horizontally extending portion and an upright portion having an aperture 95b which coincides with the aperture 95a of the first part to form the aperture of the holder. Each part of the holder is provided with a rubber retainer element as at 94, and these retainer elements are in facing relation in the operating position of the specimen holder. Further, these elements are recessed slightly from the peripheral lip which bounds the apertures.

The rightward movable part 93 of the holder is retained in position by a pair of spaced push rods 96 (FIG. 1) which are carried and actuated by mechanism now described.

A long socket head cap screw 97 (FIG. 2) passes freely through crosshead 98 which is itself rigidly secured to the push rods 96. The crosshead abuts a compression spring 99 which is confined between the crosshead and a hexagonal nut 100 threaded on the cap screw 97. Hexagonal nut 100 is in abutment with a sliding drive rod 101 to which the cap screw 97 is secured. Rod 101 (FIG. 2) is received within a housing portion 102 of a conventional toggle type commercially available clamp carried on slide 86. The frame of this clamp is designated at 103. While the clamp is a commercially available item, its operation is briefly described: the handle 107 is pivoted at the rightward end of fixed frame 103 at 106 and a link 108 is pivoted to the handle forwardly at 105 so that raising the handle upwardly rightwardly from the position of FIGS. 1 and 2 raises the pivot 105; link 108 is also pivotally attached at 104 to the rod 101 and accordingly raising the handle draws the rod rightwardly. Upon rightward movement of the rod 101 the socket head cap screw 97 abuts the crosshead and causes the crosshead to be drawn rightwardly (FIG. 2), thus withdrawing the movable part 93 of the holder from the fixed part 91 and opening the holder. To close the holder the handle is moved downwardly leftwardly to the position of FIGS. 1 and 2; the rod 101 moving leftwardly carries the socket head cap screw away from the crosshead; the spring 99 then biases the crosshead leftwardly (FIGS. 1 and 2) to close the holder.

The spring 99 performs the important function of maintaining appropriate pressure on a specimen undergoing test. Too great a spring pressure on fragile samples may cause breakage or cracking; too light a spring pressure does not effectively retain the specimen. This pressure naturally varies with the particular material undergoing test. I have found that for most packaging materials a spring having a free length of about 1¼ inches and a closed length of about ¾ of an inch under a ten pound load is generally useful.

The base 1 is further provided with leveling screws 109 as it is obviously important that the device be leveled for accurate use.

Figure 9:
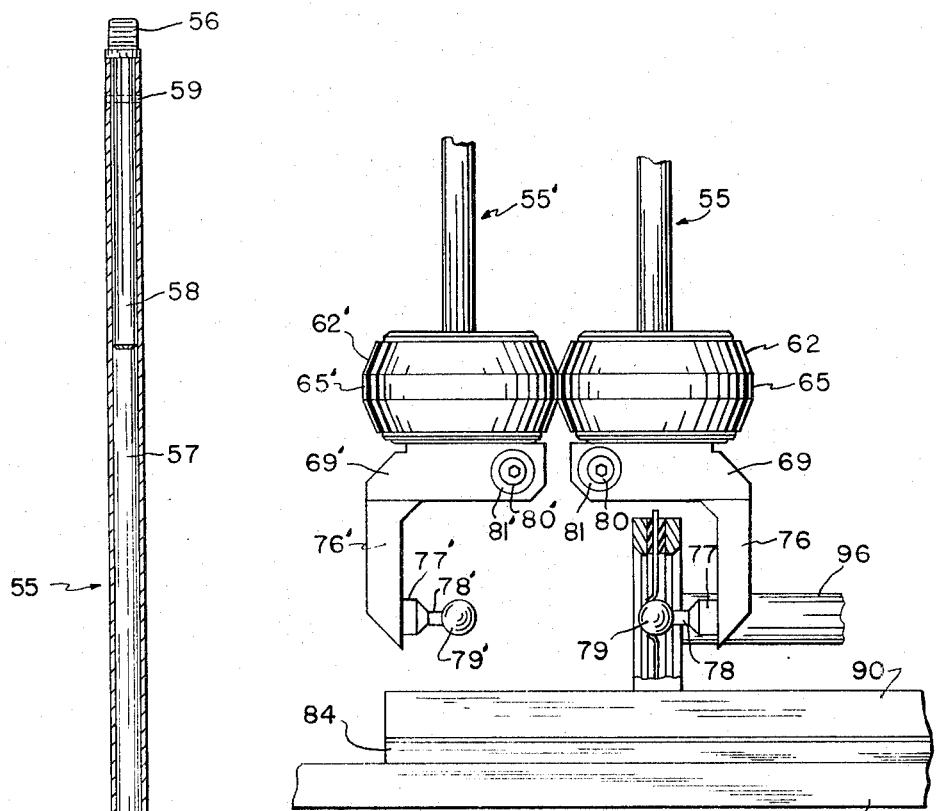
FIG. 9 is a frontal fragmentary view illustrating the device immediately after specimen penetration and with the pendulum bobs in kiss contact as energy is imparted to the second pendulum.

The impact imparting pendulum 55 described in detail above must depend vertically and is preferably so arranged relative to the specimen holder that the penetrator ball penetrates the specimen at a point directly beneath the axis of shaft 12 (FIG. 9). Since some specimens may stretch slightly prior to bursting, the specimen holder itself may be positioned slightly rightwardly of the position shown in FIG. 9 so that actual burst and penetration of the specimen occur substantially at the noted location. Adjustment of the position of the holder is achieved by movement of slide 86 (FIG. 1). Slide 86 carries the holder and clamping mechanism for the holder as noted.

The residual energy of the impact imparting pendulum 55 after burst is measured in my preferred embodiment by a second substantially identical compound pendulum 55'. Pendulum 55 includes bob 62', carrier 69' and a ball 79'. Bob 62', like its counterpart bob 62, has a rubber sleeve 64' with a flat medial zone 65' and is formed with covers 72', 73', the latter engaging the flange 74' of the carrier 69' as described in connection with pendulum 55. The carrier 69' includes a bow offset formed by depending leg or portion 76', boss 77', and stud 78' which carries the spherical ball 79'. Tare weights 81', retained by screws 80', perform the same function as tare 81 and screw 80 of pendulum 55. Associated with this compound pendulum 55' is a scale 36', a pointer 42' having a hairline 46' and an upturned shaft contact portion 47' of the pointer (FIG. 4).

Essentially, compound pendulum 55' differs from the pendulum 55 in that a counterweight 111 is provided on the upper side of the pointer 42' to provide for free motion of the pointer 42' and to balance out gravitational effects due to the pointer weight.

The pendulum 55' must depend vertically and be so positioned that it is in kiss contact with the pendulum 55, that is, the medial flat zones of the two are in kiss contact or just in force transmitting relation in the pendant condition of the pendulums. While the flat zones are not essential, they contribute to accuracy of alignment.

The scales 36 and 36' must be accurately zeroed, with the axial center lines of the respective pendulums. To accomplish these adjustments, the bearing housing 3 is leveled employing adjustment screws 109, the scales 36, 36' are then adjusted to provide the hairlines 46, 46' at zero on the scales. Holes are then spotted in the scale plates 39, 39' and the scales 36, 36' are fastened to the plates with convenient flat head screws 66 sunk flush to the scales.

In the operation of my device a specimen 110 to be tested is first mounted in the holder; specimens of self-supporting sheet stock may be held directly by the holder parts; specimens which are thin films subject to wrinkling may be mounted on a card having a die-cut opening corresponding to the holder aperture. The holder retains such materials firmly in simulation of the use of the material in commerce.

The arm 34 is set to a predetermined height as illustrated in FIGS. 1 and 2. The arm is retained by the cooperative relation of hook 54 and depending portion 76 of carrier 69. While the precise height is optional, I have found that greater accuracy is achieved if the height is such that a considerable portion of the original energy is transmitted by the impact imparting pendulum to the measuring pendulum. With the embodiment specifically described, the transmitted energy should be such as to raise the measuring pendulum at least to the degree that the scale 36' may be clearly read. More suitably, the reading should be about 10° to 20° for good accuracy. Too large an initial energy for a given specimen is not desired as it tends to make the instrument less sensitive to small strength differences in specimens.

With the arm 34 set and the trigger positioned, the trip 49 is released and the compound pendulum 55 swings under the influence of gravity to the specimen. As the penetrator element 79 completes specimen penetration (FIG. 9), the energy remaining in the pendulum 55 is essentially completely transferred to the pendulum 55'. The angular height to which the pendulum 55' rises, with due recognition of the angular height to which the pendulum 55 had been initially positioned, indicates the energy absorption in penetration of the specimen.

The compound pendulum 55' in the device specifically described merely raises the pointer 42' to its final position where it remains set; the pendulum 55' then will swing backwardly downwardly under the influence of gravity. It is preferable that the test operator prevent such return swing to the point of an impact with the first pendulum. It is obvious that, if desired, mechanism may be provided to prevent a return swing of the pendulum 55'.

It is also obvious that even with no specimen in the holder, the energy measuring pendulum will not rise to a position equal to the starting position of the impact imparting pendulum, but to a height somewhat less than that starting position. The principal causes of the dissipation of energy are friction in the bearings of the two pendulum shafts and the imperfect elasticity of the elastic elements. It has been found that by careful selection of good ball bearings and by removing the lubricating grease from the bearings to avoid viscosity changes in the lubricant due to temperature changes and age, the dissipation of energy because of bearing friction can be made very small compared to the dissipation at impact because of the imperfect elasticity of the elastic elements. The problem of dissipation of energy from the system for these and other reasons has been solved by experimental determination of the differences between starting positions of the impact imparting pendulum and positions attained by the other pendulum with no specimen in the holder and with various starting positions of the impact imparting pendulum. These experimental data can be formulated and used for any given instrument to develop correction tables for the energy values indicated by pendulum 55′ after test specimens have been ruptured, and by reasonably frequent checking to determine that the energy losses have not changed, the correction tables can be applied to indicated values; when the losses do change, the instrument must be restored to its original condition or new correction tables must be developed.

In essence I have provided a specimen holder which will retain the specimen 110 in a peripheral sense such as a film or cardboard or the like might exist in a package. Accordingly, conditions of actual service are simulated. The provision of the specimen holder in such manner and the device operation is facilitated by the employment of the compound pendulum with the penetrator element mounted below the impact bob, and the carrying portion of the penetrator element offset from the bob and the penetrator element. Striking of the specimen holder is avoided. The provision of the penetrator element below the bob requires proportioning of the compound pendulum components to provide the center of oscillation coincident with the center of impact. This has been facilitated in the present instance by the provision of the solid rods in the hollow shaft. In actual practice these solid rods are cut to a length to provide a period in the compound pendulum which meets the following test: when swinging through a small arc the period of the compound pendulum should be the same as the period of a simple pendulum swing through the same arc when the simple and compound pendulums are of the same length. Adjustment of the tare weights and the rod lengths permits achievement of this period by simple experimentation.

The length of the compound pendulum may also be determined from the formula $$L = \frac{h^2 + k^2}{h}$$

Where L is the distance from the spindle axis to the point of contact between pendulums, $h$ is the distance from the spindle axis to the center of gravity and $k$ is the radius of gyration about the center of gravity. T is then determined by the formula:

$$2\pi\sqrt{\frac{L}{g}}$$

where $g$ is the acceleration due to gravity.

A feature of my device employing the impact imparting pendulum is that the specimen holder may be offset rightwardly, FIG. 2, from the center of spindle 12, for example, without any substantial effect on the significance of the results. This is for the reason that, though the materials normally subject to test are plasti-elastic, including paper, and give varying results with the speeds of penetration—the compound pendulum for a given initial energy has a relatively constant speed over a relatively wide angle at the bottom of its swing.

It is essential that the impact imparting compound pendulum have the bob in kiss and force transmitting contact with the measuring pendulum or other measuring device when the pendulums, for example, are pendant in a static condition of the device; the residual energy in the first and impact imparting pendulum is then transferred substantially completely and movement of the first pendulum stops abruptly. It is further important for good accuracy that the contact zones be highly resilient. Preferably, the device which receives the residual energy of the compound pendulum is itself a pendulum having physical characteristics corresponding to the impact imparting pendulum.

Tests made in accordance with the above described procedures have indicated that results achieved are reproducible and may be coordinated with the results attained by the falling dart test method.

It will be understood that this invention is susceptible to modification in order to adapt to different usages and conditions and, accordingly, it is desired to comprehend such modifications within the invention as may fall within the scope of the appended claims.

What is claimed is:

1. A test device for testing the strength of paper, cardboard, plastic films, sheet material and the like, said device comprising:
    (a) a specimen holder which confines the specimen in a peripheral sense and which holder has an aperture through which a central portion of a confined specimen is exposed;
    (b) a first impact imparting compound pendulum which includes in substantially axial alignment a pendulum shaft, a pendulum bob and a penetrator element carried below the pendulum bob and to which penetrator element a confined specimen in the holder is exposed in the making of a test;
    (c) a second and energy receiving compound pendulum supported for rotation in a common vertical plane with the first compound pendulum and having a pendulum bob which is in substantially kiss contact with said first pendulum bob in a static pendant condition of the two pendulums;
    (d) means for determining the energy received by said second compound pendulum; and
    (e) a depending offset of the first pendulum in the general form of a bow opening toward the specimen holder and second compound pendulum and mounting the said penetrator element of the first pendulum in the said substantially axial alignment with said pendulum bob and pendulum shaft.

2. A test device as claimed in claim 1 and in which the periphery of each pendulum bob has a resilient covering.

3. A test device as claimed in claim 1 and in which the periphery of each pendulum bob is provided with a resilient cover and each of which covers has a peripheral flat contact zone medially of the height of the bob with which it is associated.

4. A test device as claimed in claim 1 and in which support for the two pendulums is provided by: a base, a stanchion on the base, a closed bearing housing on the stanchion, a pair of spindles extending in a horizontal plane in spaced parallel relation from the bearing housing over the base, bearings in the housing supporting each of the spindles, and means securing one spindle to the said first compound pendulum and other means securing the second of the spindles to the said second compound pendulum.

5. A test device as claimed in claim 4 and in which the said bearings form the sole contact support for the spindles.

6. A test device as claimed in claim 1 and in which the two pendulums are of identical size, weight and proportions.

7. A test device for testing the strength of paper, cardboard, plastic films and the like, said device comprising:
    (a) a horizontally extending base;
    (b) a slide mounted on the base for movement in a horizontal plane;
    (c) a specimen holder carried on the said slide and which holder confines a specimen in a peripheral sense and which holder has an aperture through which a central portion of a confined specimen is exposed;

(d) an impact imparting compound pendulum which includes a pendulum shaft, a pendulum bob and a penetrator element having a common axis and to which penetrator element a confined specimen in the holder is exposed in the making of a test;

(e) an energy receiving component in substantially kiss contact with the pendulum bob in a static pendant condition of the pendulum;

(f) means for determining the energy received by said component;

(g) a depending offset of the compound pendulum in the general form of a bow opening toward the specimen holder, the said component and the said axis, said bow mounting the said penetrator element below the said pendulum bob and on the said axis;

(h) and means including said slide for positioning said holder horizontally in a direction away from said axis and energy receiving component in a direction toward the pending offset in the static pendant condition of the pendulum.

8. In a compound pendulum, a longitudinally extending hollow shaft, a rod secured in the upper end of said shaft projecting therefrom and adapted for fixed attachment to a rotatable member, a rod secured in the lower end of said hollow shaft and projecting below the shaft, said rod having a shoulder, a hollow pendulum bob abutting said shoulder, a carrier including a hub within the pendulum bob and support means in the general form of a bow depending from the hub, and a penetrator element in the form of a spherical ball carried by the bow, said spherical ball, hollow shaft and pendulum bob being in axial alignment.

References Cited by the Examiner
UNITED STATES PATENTS 2,518,350   8/1950   McCormick _____ 73—12

RICHARD C. QUEISSER, *Primary Examiner.*

J. W. MYRACLE, *Assistant Examiner.*